United States Patent
Lohmiller

(10) Patent No.: US 7,272,470 B2
(45) Date of Patent: Sep. 18, 2007

(54) PATH GUIDANCE SYSTEMS FOR A PARACHUTE/PARAGLIDER AND FLIGHT PATH PLANNING DEVICES FOR PLANNING THE USE OF AT LEAST ONE PARACHUTE OR PARAGLIDER, AND SYSTEM FOR CARRYING OUT SAID PATH GUIDANCE AND PLANNING

(75) Inventor: Winfried Lohmiller, Munich (DE)

(73) Assignee: Eads Deutschland GmbH, Ottobrunn (DE)

(*) Notice: Subject to any disclaimer, the term of this patent is extended or adjusted under 35 U.S.C. 154(b) by 706 days.

(21) Appl. No.: 10/486,915

(22) PCT Filed: Aug. 23, 2002

(86) PCT No.: PCT/DE02/03136

§ 371 (c)(1),
(2), (4) Date: Apr. 7, 2004

(87) PCT Pub. No.: WO03/018401

PCT Pub. Date: Mar. 6, 2003

(65) Prior Publication Data

US 2004/0153218 A1    Aug. 5, 2004

(30) Foreign Application Priority Data

Aug. 24, 2001 (DE) ............... 101 40 676

(51) Int. Cl.
*G01C 23/00* (2006.01)
(52) U.S. Cl. .................. 701/3; 701/4; 701/5
(58) Field of Classification Search .......... 701/3, 701/4, 5, 6, 7, 9, 10, 11; 244/46, 47, 142, 244/153 R, 155 A, 901, 902
See application file for complete search history.

(56) References Cited

U.S. PATENT DOCUMENTS

| 5,522,567 | A | | 6/1996 | Kinstler |
| 5,915,650 | A | * | 6/1999 | Petrovich ............ 244/46 |
| 6,682,017 | B1 | * | 1/2004 | Giannakopoulos ..... 244/140 |

FOREIGN PATENT DOCUMENTS

| DE | 3728560 | 11/1988 |
| DE | 4321329 | 1/1994 |
| DE | 4336056 | 4/1995 |

* cited by examiner

*Primary Examiner*—Richard M. Camby
(74) *Attorney, Agent, or Firm*—Greenblum & Bernstein, P.L.C.

(57) ABSTRACT

Flight path planning device for determining path guidance specifications for at least one parachute or paraglider (5), which determines an altitude/time corridor (20, 30) as a flying range to be maintained by the parachute or paraglider (5) or an altitude/timeline (28) as a desired specification, the limits of which are formed from altitude/timelines (22, 24; 31, 32) on the basis of a reference point determined by an altitude and a time coordinate, whereby the course of the altitude/timelines is formed respectively from the integral of a predetermined sink rate (v)/time and whereby different sink rates are assigned to the altitude/timelines, and a path guidance system for determining control specifications for controlling the parachute or paraglider.

16 Claims, 3 Drawing Sheets

Figure 1:
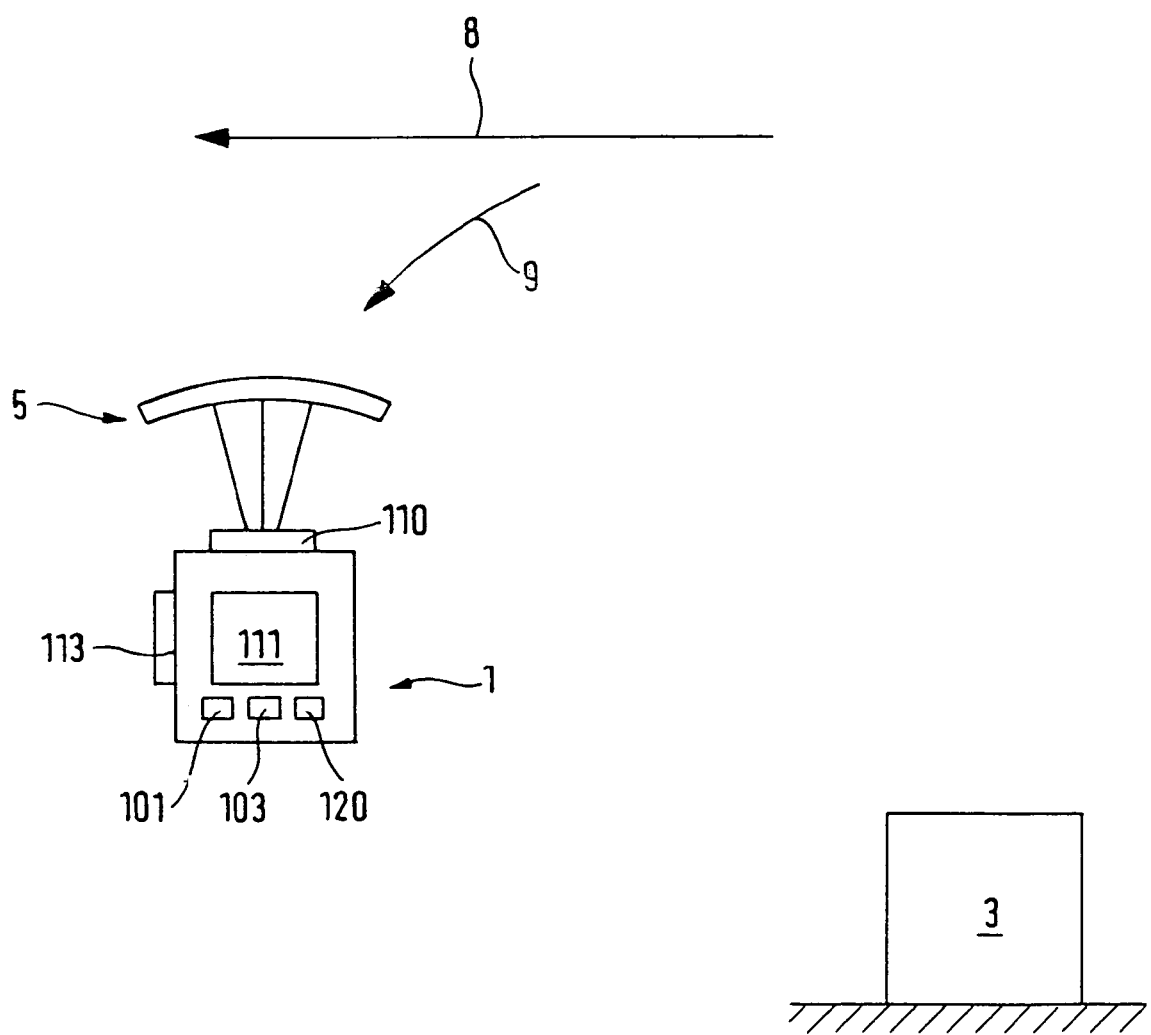

PATH GUIDANCE SYSTEMS FOR A PARACHUTE/PARAGLIDER AND FLIGHT PATH PLANNING DEVICES FOR PLANNING THE USE OF AT LEAST ONE PARACHUTE OR PARAGLIDER, AND SYSTEM FOR CARRYING OUT SAID PATH GUIDANCE AND PLANNING

The invention relates to path guidance systems for a parachute or paraglider and processes provided for implementation in a computer system for path guidance and flight path planning devices and processes provided for implementation in a computer system for planning the deployment of at least one parachute or paraglider. Flight planning stations for planning flight routes for aircraft are known as the prior art. Furthermore, navigation equipment for paraglider pilots is known from the general prior art.

In DE 43 36 056 A1 it is proposed in order to achieve the greatest possible local accuracy with reference to a spatially determined landing point, to provide a position-determining unit, a flight control device and operating means for steering a parachute with which the parachute is to be kept on a desired flight path. According to DE 43 36 056 A1, the desired flight path is determined in a first embodiment in a very complex manner in a flight planning computer, whereby the actual calculation process is not disclosed. In another embodiment of DE 43 36 056 A1 the desired flight path is determined by means of a GPS position sensor by a parachutist flying ahead, in that his actual flight path determined according to the three space coordinates is transmitted via a radio transmitter to subsequent parachutes. By these means a parachute is kept on a predetermined flight path and steered to the landing point.

The process proposed in DE 43 36 056 A1 has the disadvantage that local wind conditions make controlling a plurality of parachutes impossible, since they cannot keep to the desired flight path, e.g., due to strong downdrafts or headwinds. Another disadvantage is that it is mandatory for the desired flight path to be determined in its spatial course and transmitted to the flight control device. Thus a position-determining unit in the form of a GPS position sensor is necessary in the flight control device of DE 43 36 056 A1, which has the disadvantage, for example, that it is interference-prone and in unfavorable terrain, in particular in mountainous areas or in hostile terrain, reception is not ensured in every flight phase. Moreover, the calculation of desired flight paths according to DE 43 36 056 A1 is laborious and dependent on some uncertainties, such as, e.g., correct assumptions about the wind profile.

The object of the invention is to provide a device for planning and path guidance for setting down parachutes and corresponding processes, which device is largely independent of atmospheric conditions, can be realized with the simplest possible technical means and is also suitable for a large number of parachutes or paragliders.

This object is attained with the features of the independent claims. Further embodiments are disclosed in their dependent claims.

According to the invention, a very simple system can be used for path guidance and control, since only a clock and a pressure gauge to determine the actual values and a comparison device to compare these with the desired altitude/time coordinates is necessary. The planning device according to the invention is likewise very simple to execute, since to determine the desired specifications in the form of the altitude/time coordinates simple calculations without complex models, e.g., for wind profiles or pressure conditions, can be used. The system for path guidance and control according to the invention is not interference-prone, either, which is very important in the case of military deployments. Because a satellite navigation device is no longer necessary, deployment in difficult terrain, such as, e.g., in mountainous areas where reception is not guaranteed in every flight phase. These disadvantages are overcome with the approach according to the invention.

When setting down a large number of parachutes, by using altitude/time coordinates for the desired path and the path guidance and control, it is ensured that local wind and pressure conditions no uncertainty can occur regarding keeping minimum distances between the parachutes and in this manner collisions can be avoided with great reliability.

Figure 2:
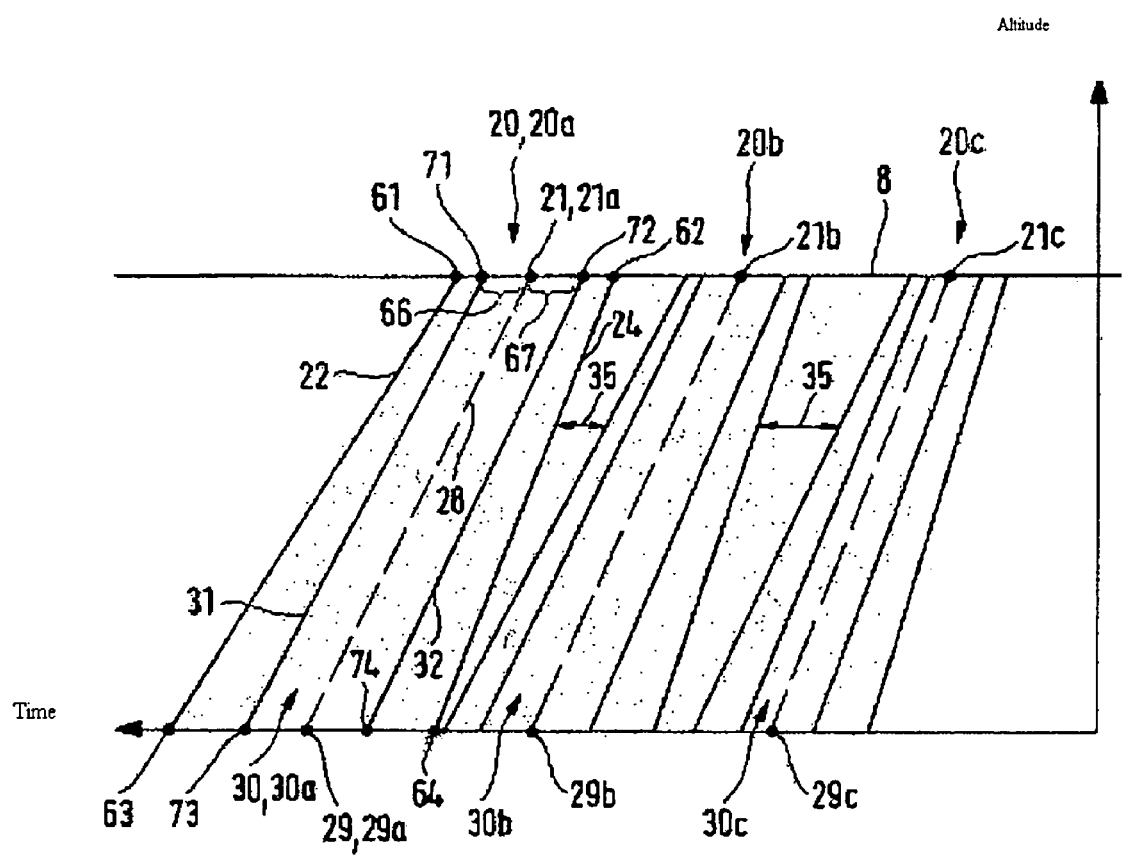
Figure 3:
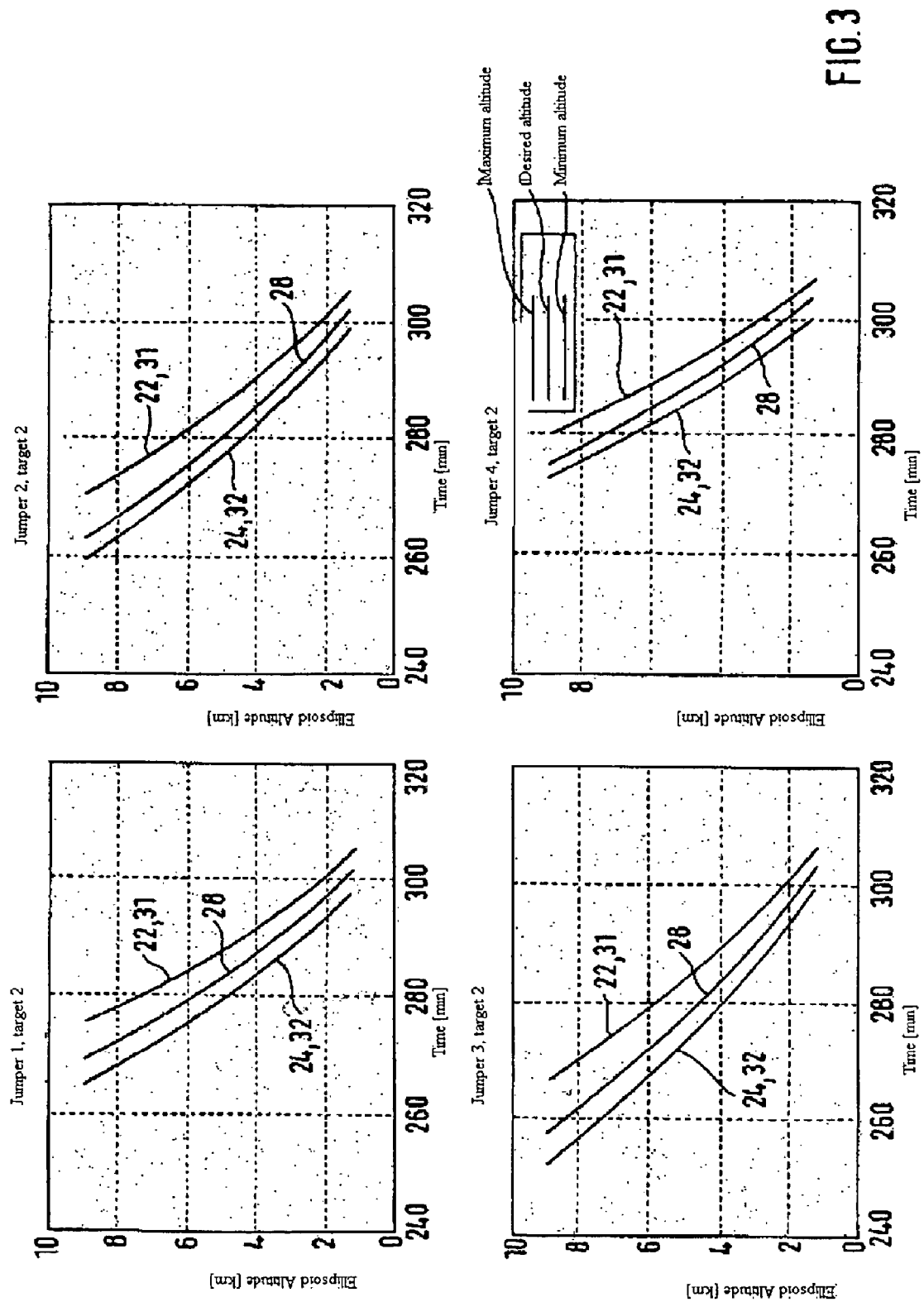

The invention is described below on the basis of the attached figure. They show:

FIG. 1 A diagrammatic representation of the path guidance system for a parachute or paraglider according to the invention and the deployment control device according to the invention assigned thereto, FIG. 2 A diagrammatic representation of three exemplary path guidance corridors and assigned altitude/timelines according to the invention, which together form a corridor arrangement according to the invention, FIG. 3 Four individual diagrams with respectively one altitude/time corridor and the assigned reference line, whereby the four corridors do not overlap one another and together represent a corridor arrangement according to the invention.

FIG. 1 shows a path guidance system 1 for a parachute or paraglider and a deployment system or a flight path planning device 3 according to the invention, which system can be used for the path guidance system 1. The path guidance system 1 for a parachute or a paraglider is part of a load 6 carried by a parachute or paraglider 5, which load can also include a person. The parachute or paraglider 5, which is in flight in the representation in FIG. 1, has been set down by an aircraft 7 whose flight path or whose desired altitude line is represented symbolically by an arrow 8. The flight path of the parachute or paraglider 5 is represented symbolically by an arrow 9.

The path guidance system 1 for a parachute or paraglider comprises a flight path control system 111 that determines control specifications for controlling the path guidance system 1 for a parachute or paraglider, and a man-machine interface 113 that can comprise, e.g., a display or a loudspeaker.

The parachute or paraglider 5 for which the path guidance system 1 according to the invention or the associated process is provided, can be manned or unmanned. If the parachute or paraglider 5 is unmanned, the parachute or paraglider system 1 still features a control unit 110 to control the parachute or paraglider 5 with an operating unit to adjust its control surfaces. Such a control unit 110 with operating unit can optionally also be provided for a manned parachute or paraglider 5 in the path guidance system 1 according to the invention.

The deployment system 3 or the process provided for it determines path guidance specifications for a single path guidance system of a parachute or paraglider 5 or for path guidance systems 1 of parachutes or paragliders 5 of a parachute or paraglider group, whereby a desired aircraft path 8 from which the at least one parachute or paraglider 5 is set down, is used as a reference line. The deployment system 3 can be embodied as a ground station, as a mobile instrument or as an instrument carried on or installed in the aircraft.

The deployment system 3 according to the invention and corresponding processes are described below:

The deployment system 3 determines for at least one parachute or paraglider 5 path guidance specifications in the form of one or more altitude/time corridors or, in an alternative path guidance concept, in the form of an altitude/timeline for each parachute or paraglider 5 to be guided or in a form to be derived therefrom. The altitude/timeline or the altitude/time corridor are each determined through their altitude course as a function of the time on the basis of assumed sink rates that can also be altitude- and time-dependent.

The altitude/time corridor used to form the path guidance specifications according to the invention can be a desired corridor 20 or a safety corridor 30 or, alternatively, can comprise a desired corridor 20 as well as a safety corridor 30. These corridors 20 or 30 respectively represent a permissible altitude/time range or desired range or a safety range determined by altitude and time, in which range the respective parachute or paraglider 5 is guided with the aid of the specifications compiled by the path guidance system 1. The at least one altitude/time corridor 20, 30 or the at least one altitude/timeline on the one hand can be formed on the basis of a start or set-down point 21 that is predetermined or determined by means of the deployment system 3, which start or set-down point 21 is determined by an altitude and a time and in general is independent of the geographical location. The set-down point 21 can be located in particular on the desired aircraft path 8 or can be a fictitious set-down point independent thereof which in turn is to be determined by a specific altitude and a specific time. On the other hand, the altitude/time corridor 20, 30 or the altitude/timeline can be formed on the basis of a touchdown point 29 that is determined by its altitude and a time.

In the formation of the desired corridor 20 through the deployment system 3, the desired corridor 20 is defined by a first or upper desired altitude/timeline 22 that is derived from a minimum sink rate of the parachute or paraglider 5 and through a second or lower desired altitude/timeline 24 that is derived from a maximum sink rate of the parachute or paraglider. The minimum and maximum sink rate can be determined respectively from a nominal sink rate or directly. A nominal sink rate provides a reference altitude/timeline 28 that can likewise be determined in the deployment system 3. Safety altitude/timelines 31, 32 to form the safety corridor 30 are located at a distance, which in general is time-dependent, from a desired altitude/timeline 22, 24 in the direction of the respectively assigned desired altitude/timeline of the same corridor.

Alternatively, the formation of the desired corridor 20 can also be made through the deployment system 3 from the nominal sink rate and the reference altitude/timeline 28 derived therefrom. The desired altitude/timelines 22, 24 can be determined from this at a distance from the reference altitude/timeline 28, which distance in general is altitude- and time-dependent.

Furthermore, within the desired corridor 20 a safety altitude/time corridor or safety corridor 30 can be provided, which is limited by a first or upper safety altitude/timeline 31 and a second or lower safety altitude/timeline 32. The first 31 and the second safety altitude/timeline 32 is respectively removed from the first desired altitude/timeline 22 or the second desired altitude/timeline 24 by a distance that is constant or variable over the altitude and with reference thereto lies respectively on the side of the reference line 28. The deployment system 3 can also be embodied in such a way that it determines only safety altitude/time corridors 30 from corresponding equations directly, i.e., without forming the first 22 and the second desired altitude/timeline 24.

To form the desired altitude/timelines 22, 24, the safety altitude/timelines 31, 32 and the reference altitude/timeline 28, a starting point respectively determined in time and altitude, which starting point is the set-down point or start point 21 or is derived therefrom, or an end point that is the touchdown point 21 or is derived therefrom, in general, therefore, a reference point can be taken as the basis, whereby the reference point is established according to an altitude and a time coordinate. For each time a point of the respective altitude/timeline 22, 24, 31, 32, 28 results that is determined according to the invention, in that from the altitude associated with the respective reference point an altitude difference on the basis of a landing point as reference point is added or on the basis of a set-down point as reference point is subtracted. This altitude difference thereby results on the basis of an assumed or determined sink rate of the respectively used parachute or paraglider 5 and a given one. The altitude to be subtracted from or added to a reference point is formed from the integral of the respective sink rate/the time elapsing from the reference time associated with the reference point.

In mathematical notation on the basis of a reference point with the altitude $H_a$ on the basis of a sink movement with the velocity v, the altitude H associated with a specific time results as follows:

$$H = H_a - {_{t_a}^{t}}\!\int v \cdot dt$$

On the basis of a predetermined end point of the path of the paraglider or parachute as reference point with the altitude $H_e$, the altitude H associated with a specific time results with an observation contrary to the time direction on the basis of a fictitious upward movement of the parachute with the velocity v:

$$H = H_e + {_{t_e}^{t}}\!\int v \cdot dt$$

The meaning of the individual labels is as follows:
H Altitude of the altitude/time coordinates of an altitude/timeline to be determined
t The time associated with H
$H_a$—Starting altitude of a reference point when the movement is observed in the time direction
$t_a$—The starting time associated with $H_a$
$H_e$—End altitude of a reference point when the movement is observed contrary to the time direction
$t_e$—The end time associated with $H_e$
v—The sink velocity of the parachute or paraglider 5 which can be in particular a function of the altitude H.

A nominal, a minimum or a maximum sink velocity can be used as the sink velocity, depending on the altitude/time coordinates to be determined of an altitude/timeline 22, 24, 31, 32, 28 as described.

In the use of the invention for the coordinated path guidance and the determination of corresponding path guidance specifications of several parachutes or paragliders, according to the invention the respective reference point is specifically selected for the respective parachute or paraglider 5 in time and altitude such that the relevant altitude/time corridors for different parachutes or paragliders 5 do not overlap or, alternatively, a generally altitude- and time-dependent distance is maintained. The desired corridor 20 or the safety corridor 30 or both cited corridors or combinations of the same can be used to determine the distance between respectively relevant altitude/time corridors. The corridors for different parachutes or paragliders can be designed differently.

In determining the path guidance specifications on the basis of the use of altitude/timelines, predetermined minimum distances between the respectively adjacent altitude/timelines are to be provided which can be altitude- and time-dependent.

The first desired altitude/timeline 22 features a first start or reference point 61 lying at a first end and possibly on the desired aircraft altitude line 8 and the second desired altitude/timeline 24 features a second start or reference point 62 likewise lying at or related to its first end and possibly on the desired or actual aircraft altitude line 8. In an analogous manner the desired altitude/timelines 22, 24 feature a first 63 and a second 64 desired end point at their second ends. The formation of the desired corridor 20 according to the invention can be made via the definition of these desired start or end points by means of the above formulae using the relevant sink velocity. Alternatively, the desired altitude/timelines 22, 24 can be formed from the reference altitude/timeline 28, whereby the desired altitude/timelines result from the reference altitude/timeline 28 by the addition or subtraction of a generally altitude- and time-dependent distance thereby.

In a further embodiment of the invention the altitude/timelines are formed on the basis of an altitude point of a first altitude/timeline, e.g., of the reference or a first desired or safety altitude/timeline by the addition of a corresponding time interval.

The desired start or end points 61, 62, 63, 64 for the first 22 and second 24 desired altitude/timeline can thereby also be defined independently of the desired or actual aircraft altitude line 8. The first 61 and the second 62 desired start point can also be established as identical to the set-down location 21, i.e., these can also be identical. Preferably the first desired start point 61 for a first altitude/timeline is at a first distance 66, e.g., in the flight direction before the set-down point 21 or another reference point, and the second desired start point 62 for a second altitude/timeline is at a second distance 67, e.g., in the flight direction after the set-down point 21 or another reference point, whereby the first distance 66 can be equal to the second distance 67. Preferably the first distance 66 due to the speed of the aircraft setting down the parachute or paraglider is greater than the second distance 67 by an amount, whereby this amount depends on the aircraft speed. This applies analogously to the desired end points 63, 64. The given boundary conditions can be met on the basis of an assessment of the local atmospheric conditions or on the basis of calculations.

The determination of the safety altitude/timelines 31, 32 can take place analogously via a corresponding first 71 and second 72 start reference point or a corresponding first 73 and second 74 end reference point. Correspondingly, according to the invention the formation of the safety altitude/time corridor 30 can be made via the definition of start or end reference points.

However, the desired corridors 20, safety corridors 30 or, in the alternative path guidance concept, altitude/timeline can also be formed relative to one another through the addition of a time interval between respectively adjacent corridors or altitude/timelines.

An average altitude/timeline or reference line 28 can be determined between the first desired altitude line 22 and the second desired altitude line 24, which average altitude/timeline passes through the set-down point 21 and an average or reference touchdown point 29 or points derived therefrom. The formation of the reference line 28 can also be made from at least one desired altitude/timeline 22, 24.

The first desired altitude/timeline 22 and the second altitude/timeline 24 are determined as a function of the time at least regarding their altitude course. Accordingly, the set-down point 21, the touchdown point 29 and the reference points 71, 72, 73, 74 are established according to the altitude and the time.

The course of the altitude/timelines 22, 24, 31, 32, 28 results from the anticipated minimum or maximum or nominal sink rate. The respective relevant sink rate or the sink rate used in an embodiment can be established in the deployment system 3 on the basis of predetermined assumptions, determined experimentally or determined from influencing variables. The atmospheric or wind conditions, the air density as a function of the altitude or parachute or paraglider parameters can advantageously be used as influencing variables. In particular, the mass of the parachute or paraglider and what is attached, i.e., the pilot with load, and lift coefficient, the effectiveness of the control surfaces as a function of the regulating distance of the control lines and the surface of the parachute or paraglider can be included in the determination of the sink rates as parachute or paraglider parameters. The wind conditions can be detected by means of a suitable wind model, by means of the assumption of disturbances, such as, e.g. maximum updrafts and downdrafts, or by means of other assumptions about the wind conditions and included in the sink rate determination.

Determining the minimum and maximum sink rate can be done in different ways. Preferably, a standard or nominal sink rate is taken as a basis which, e.g., have been determined by experimental methods. The effect of the mentioned or, if necessary, also other influencing variables on the minimum and maximum sink rate can take place on the basis of a minimum and maximum reference sink rate via deviations that are determined via measure coefficients of the influencing variables and weighting factors.

The courses of the desired altitude/timelines 22, 24 and the safety altitude/timelines 31, 32 and the reference line 28 can be straight or also curved, depending on the consideration of the influencing variables.

The deployment system 3 according to the invention can also determine several desired altitude/time corridors 20a, 20b, 20c and/or associated safety altitude/time corridors 30a, 30b, 30c (FIG. 3). At least the safety altitude/time corridors and, if necessary, the desired altitude/time corridors for various parachutes and paragliders 5 are generally located in a predetermined manner relative to one another and in particular relative to one another such that they do not overlap at one time. Preferably a corridor distance 35 can be provided between the desired altitude/time corridors or the safety altitude/time corridors.

A plurality of altitude/time corridors or safety altitude/time corridors determined by the deployment system 3 is provided for a plurality of parachutes or paragliders 5, whereby a desired altitude/time corridor or safety altitude/time corridor is assigned to each parachute or paraglider 5.

The determination of the desired altitude/time corridors 20 or safety altitude/time corridors 30 or alternatively of the altitude/timelines is made for the purpose of coordinating the flight path of a parachute or paraglider 5 or of several parachutes or paragliders. The guidance of only one parachute or paraglider 5 can be provided to ensure the touchdown of the parachute or paraglider 5 in the terrain within a predetermined time window. In determining several altitude corridors or operational altitude corridors or alternatively of altitude/timelines for several parachutes or paragliders, these are preferably provided in order to guide each parachute or paraglider in a region that is safe for it and in order to avoid a collision with another parachute or paraglider 5.

The desired altitude/time corridors 20 or safety altitude/time corridors 30 or alternatively altitude/timelines can be provided within the deployment system 3 or another control unit for the planning and control of parachute or paraglider deployments. Parachute or paraglider pilots can use these desired altitude/time corridors 20 or safety altitude/time corridors 30 with or without a path guidance system 1. Without the path guidance system 1, the corridors can serve the pilots as orientation. An alternative path guidance system 1 according to the invention determines concrete path guidance specifications for the parachute or paraglider pilot in order to also indicate them to him.

Data for describing the desired altitude/time corridor 20 or safety altitude/time corridor 30 provided for a concrete parachute or paraglider system or alternatively altitude/timelines can be transmitted from the deployment system 3 to the respective path guidance system 1 on the one hand manually before the respective parachute or paraglider flight or via a data line. On the other hand, this transmission can also occur during the flight by radio connection.

The flight path planning device according to the invention for determining path guidance specifications for at least one parachute or paraglider 5 determines an altitude/time corridor 20, 30 as a flying range to be maintained by the parachute or paraglider 5, the limits of which flying range are formed by altitude/timelines 22, 24; 31, 32 on the basis of a reference point determined by an altitude and a time coordinate, whereby the course of the altitude/timelines 22, 24; 31, 32 is respectively formed from the integral of a predetermined sink rate v/time, and whereby different sink rates are assigned to the altitude/timelines 22, 24; 31, 32. The altitude/time corridor can be formed from a first altitude/timeline on the basis of a maximum sink rate and from a first altitude/timeline on the basis of a minimum sink rate of the parachute or paraglider. Alternatively, the flight path planning device determines an altitude/timeline 28 on the basis of a reference point determined by an altitude and a time coordinate as a desired line to be maintained by the parachute or paraglider at a predetermined distance, the course of which desired line is formed from the integral of a predetermined sink rate (v)/time. The reference point can be a set-down point or a touchdown point. According to the invention, in particular several altitude/time corridors 20, 30 or several altitude/timelines 28 can be used which are staggered from one another in a constant manner or in a time-dependent manner regarding the time coordinate in order to render possible the set-down of a large number of parachutes or paragliders.

Correspondingly, according to the invention a process provided for implementation in a computer program system for determining path guidance specifications for the control of parachutes or paragliders is provided, in which process the described altitude/time corridor 20, 30 or the desired altitude/timeline 28 is determined.

According to the invention, a path guidance system and corresponding processes for implementation in such a path guidance system is also described:

The path guidance system 1 according to the invention as part of a parachute or paraglider system uses data to describe at least one corresponding desired altitude/time corridor 20 or safety altitude/time corridor 30 or, alternatively, at least one altitude/timeline that have been transmitted from a planning device or manually entered. In particular with manual entry, path guidance system 1 calculation algorithms can be implemented so that only very few or simple entries are necessary, e.g., a nominal sink rate of the parachute or paraglider 5 or a maximum or minimum sink rate. The path guidance system 1 determines path guidance measures or specifications on the basis of the path guidance specifications in the form of the altitude/timeline or the altitude/time corridor and the current altitude/time coordinates at which the parachute or paraglider is located. These can be transmitted to a display or generally to a man-machine interface (MMI) so that a pilot can implement them accordingly in controlling the parachute. The MMI can also be present in an external unit, e.g., in a ground station or in an aircraft, in order to control the parachute or the parachutes from there via transmit and receive devices. Alternatively or additionally, this information can also be transmitted to a control system 111 or a corresponding unit that determines control commands from variance differences, which commands are likewise transmitted to the MMI or a corresponding actuator that automatically controls the parachute with reference to the desired specifications.

An altitude measuring device 101 and a time measuring device 103 are assigned to the path guidance system 1 according to the invention. The altitude measuring device 101 can be realized by a satellite altitude measuring device or a satellite navigation device or a pressure cell or another altitude measuring device according to the prior art. With the aid of the altitude measuring device 101, the path guidance system 1 or the flight path control system 11 determines the current altitude of the parachute or paraglider and with the time measuring device 103, the current time.

A flight path control system 111 assigns at a or for a specific time the current altitude coordinates to the corresponding altitude coordinates of a limit line or both limit lines of the altitude/time corridor or safety altitude/time corridor according to the invention or the altitude coordinates of another relevant altitude/timeline. In the alternative path guidance concept the current altitude coordinates are assigned to the corresponding altitude coordinates of a corresponding altitude/timeline according to the invention.

The path guidance system 1 according to the invention thus uses an altitude/time specification for the path curve of the respective parachute or paraglider 5 and compares the altitude/time specification to the actual time and the actual altitude. From this a representation can be made for the actual altitude relative to the altitude/time specification for display by a man-machine interface (MMI) 113. The flight path control system 111 can thereby be determined in particular the minimum and maximum desired altitude and the actual altitude of the parachute or paraglider for the current time or iteration step. This also applies for the automatic control.

Alternatively or additionally to a representation of the relative actual altitude, a control specification can also be transmitted to the pilot, whereby the control specification comprises an increase or decrease in altitude to be achieved in visual form by means of a graphic representation and additionally or alternatively in auditory form by means of a speech system. This specification can be made thereby in absolute values or with reference to a path specification, such as, e.g., a desired altitude/timeline. The MMI informs the pilot whether he is still in the permissible and/or safe altitude/time range. The permissible altitude range is limited by the desired altitude/timelines. The safe altitude/time range is limited by the safety altitude/timelines. The departure from a desired altitude/timeline or limit lines of the relevant altitude/time corridor can also be displayed analogously by means of an indicator instrument or also by means of at least one color field. The color red could thus mean that the pilot has to steer maximally or almost maximally in a specific direction. The direction, i.e., whether a lowest possible or highest possible sink rate is required, can be determined through additional information. The form of the respectively used color field or the selection or position of the color field are thereby possible. Green could thereby mean that no additional control measure is necessary. A third color, such as, e.g., yellow, could mean an intermediate area with reference to the necessary control measure. Instead of the colors mentioned by way of example, other colors can be used for the color fields from ergonomic viewpoints.

Alternatively or additionally the measure the pilot has to take in order to fly in the permissible or safe altitude/time range can also be indicated in another way. Verbal commands can thereby be used which indicate to the pilot the deviation from the average desired altitude line or reference line 28 and/or the distance from the relevant points of the desired altitude/timelines 22, 24 and/or from the desired altitude/timelines 31, 32. A command can be, "reduce sink flight," or "dropped below safe altitude range." These commands can also be made on the basis of corresponding differences with continuous distance data from the relevant desired altitude/timelines 22, 24, safety altitude/timelines 31, 32 or the reference line 28.

In another embodiment of the path guidance system 1 according to the invention, in addition it determines a predicted spatial path curve or also a predicted spatially fixed touchdown time on the basis of a corresponding sink rate of the parachute or paraglider 5 and transmits it or them to the pilot in visual form by means of a graphic representation and additionally or alternatively in auditory form by means of a speech system. With this image the prior flight path can also be represented in the space coordinates and/or in the altitude/time coordinates, the desired altitude/time corridor 20 and/or the safety altitude/time corridor 30 and/or the reference altitude/timeline 28 or, with the alternative path guidance concept, an altitude/timeline to which the respective parachute or paraglider 5 is assigned and/or other of these specifications. In particular, in addition to these specifications, locally adjacent specifications and, if necessary, actual positions or prior flight paths of adjacent parachutes or paragliders transmitted to the path guidance system 1 by radio can also be displayed. Distances from these path specifications and control specifications resulting from them can also be transmitted to the pilot in an auditory manner by means of the speech system.

In determining the predicted path curve, other functions or values can be incorporated, such as, e.g., an atmospheric altitude profile. A straight flight or a curved flight, such as, e.g., constant rate of rotation, can be taken as a basis. In another embodiment, a predicted touchdown time can be determined via the predicted path curve and indicated via the man-machine interface 113.

In another embodiment of the path guidance system 1 it features a navigation system 120 for determining the actual position of the parachute or paraglider 5. In a corresponding manner the man-machine interface 110 transmits the actual position of the parachute or paraglider 5 with reference to predetermined reference points, preferably in the form of a visual representation. In another embodiment the path guidance system 1 can have terrain data loaded in a corresponding storage element. In this case, the man-machine interface 113 can indicate the actual position with reference to terrain points visually or in an auditory manner. On the basis of the described predicted flight path in particular warnings with reference to undesirable touchdown points in the terrain can also be given thereby. A three-dimensional graphic representation of the actual position with reference to and optionally the predicted touch-down point and/or a predetermined touch-down point within a terrain region likewise represented can be given. In this representation, the prior flight path, the desired altitude/time corridor 20 and/or the safety altitude/time corridor 30, and/or the reference altitude/timeline 28 or, in the alternative path guidance concept, an altitude/timeline to which the respective parachute or paraglider 5 is assigned and/or more of these specifications can. In particular in addition to these specifications locally adjacent specifications and, if necessary, actual positions or prior flight paths of neighboring parachutes or paragliders transmitted to the path guidance system 1 by radio can also be indicated. Distances from these path specifications and resulting control specifications can also be given to the pilot in an auditory manner by means of the speech system.

The described functions of the path guidance system 1 can be integrated in terms of equipment technology and also functionally with the flight path control system 111, the altitude measuring device 101, the time measuring device 103, if necessary, the navigation device and the man-machine interface in one or more modules according to the prior art.

In the application of the invention, the pilot with the parachute or paraglider 5 or the unmanned parachute 5 is set down directly in the desired corridor or safety corridor 30 assigned to it. In the alternative path guidance concept, the parachute or paraglider can also be set down at a specified distance from an altitude/timeline. Alternatively, the parachute or paraglider 5 can also be set down outside the desired corridor 20 or outside the specified distance. With the aid of the data from the man-machine interface, the pilot is able through corresponding steering movements to steer into the desired corridor assigned to him or at a specified distance from a desired altitude/timeline or to land or touch down in the terrain at a specified time. The same applies to the automatic control by the control unit 110. The control unit 110 can also be controlled from a deployment point by means of radio or manually controlled by a pilot sitting at a deployment point.

According to the invention, the path guidance system is a device for determining control specifications at a man-machine interface or a control unit for controlling a parachute or paraglider 5, whereby this features an altitude measuring device 101 for determining the current altitude of the parachute or paraglider 5, a time measuring device 103 and a flight path control system 111 that compares the current altitude and time with an altitude/timeline 22, 24; 31, 32; 28 formed from a sink rate v/time, and determines control specifications from the determined difference from the altitude/timeline, in order to transmit them to the man-machine interface 110 or the control unit 10. The altitude/timeline can be a single line provided for the respective parachute or paraglider or one of two limit lines of an altitude/time corridor. In the latter alternative that line is respectively decisive to which the parachute according to the current situation, e.g., on the basis of its distance from the lines, should be oriented.

According to the invention a corresponding process provided for implementation in a computer program system for determining control specifications is provided at a man-machine interface or a control unit for controlling a parachute or paraglider 5. Thereby specifications are produced that result from the comparison of the current altitude/time coordinates of the parachute or paraglider and at least one predetermined altitude/timeline 22, 24; 31, 32, the course of which is formed respectively from the integral of a predetermined sink rate (v)/time.

The invention claimed is:

1. A flight path planner for determining path guidance specifications for at least one of a parachute and a paraglider, comprising:
   a determiner that determines an altitude/time corridor that is a flying range to be maintained by the at least one parachute and paraglider, limits of the flying range being formed by altitude/timelines on a basis of a reference point determined by an altitude and a time coordinate,
   wherein a course of the altitude/timeline corridor is determined from an integral of a predetermined sink rate (v)/time and whereby different sink rates are assigned to each of the altitude/timelines.

2. The flight path planner according to claim 1, wherein the determiner determines at least two altitude/time corridors for the at least one parachute and paraglider, the at least two altitude/time corridors having limits which are spaced apart from one another at a predetermined altitude-dependent and time-dependent distance.

3. The flight path planner according to claim 1, wherein the reference point is one of a set-down point and a touch-down point.

4. The flight path planner according to claim 1, wherein the altitude/time corridor is determined on a basis of a maximum sink rate and a minimum sink rate of the at least one parachute and paraglider.

5. The flight path planner according to claim 1, wherein the altitude/time corridor is determined from a nominal altitude/timeline on a basis of a nominal sink rate and the limits of the altitude/time corridor are determined based on differences from the nominal altitude/timeline.

6. The flight path planner according to claim 1, wherein a respective sink rate is derived using a lift coefficient and an effectiveness of control surfaces as a function of a regulating distance of control lines and a surface of the at least one parachute and paraglider.

7. A process for determining path guidance specifications for controlling a flight path planner for at least one of a parachute and a paraglider for implementation in a computer program system, comprising:
   determining an altitude/time corridor as a flying range to be maintained by the at least one parachute and paraglider, limits of the flying range being formed from altitude/timelines and a course of which is formed respectively from an integral of a predetermined sink rate (v)/time, whereby different sink rates are assigned to the limits.

8. A flight path planner for determining path guidance specifications for at least one of a parachute and paraglider, wherein the flight path planner determines an altitude/timeline specification on a basis of a reference point determined by an altitude and a time coordinate as a desired line to be maintained by the at least one parachute and paraglider at a predetermined distance, a course of the desired line being determined from an integral of a predetermined sink rate (v)/time.

9. The flight path planner according to claim 8, wherein the flight path planner determines at least two altitude/timelines for the at least one parachute and paraglider, the at least two altitude/timelines being spaced apart from one another at a predetermined altitude-dependent and time-dependent distance.

10. The flight path planner according to claim 8, wherein the reference point is one of a set-down point and a touch-down point.

11. The flight path planner according to claim 8, wherein the respective sink rate is derived using a lift coefficient and an effectiveness of control surfaces as a function of a regulating distance of control lines and a surface of the at least one parachute and paraglider.

12. A process for implementation in a computer program system for determining path guidance specifications for controlling at least one parachute and paraglider, comprising:
   forming an altitude/timeline on a basis of a reference point determined by an altitude and a time coordinate, said altitude/timeline being a desired line to be maintained at a predetermined distance by the at least one of parachute and paraglider, a course of the desired line is formed from an integral of a predetermined sink rate (v)/time.

13. A path guidance system for determining control specifications to one of a man-machine interface and a controller that controls one of a parachute and paraglider, comprising:
   an altitude measurer that determines a current altitude of one of the parachute and paraglider;
   a timer and a flight path controller that compares a current altitude and time to saved limits of an altitude/time corridor formed from one of a minimum and maximum sink rate (v)/time and determines control specifications from a determined difference of a current actual position from the limits of the corridor and transmits the control specifications to the one of the man-machine interface and the controller.

14. A process for implementation in a computer program system for determining control specifications for controlling at least one of a parachute and paraglider, comprising:
   comparing a current altitude and time to saved limits of an altitude/time corridor formed from one of a minimum and maximum sink rate (v)/time,
   determining control specifications from a determined difference from the limits; and
   transmitting the control specifications to one of a man-machine interface and a controller.

15. A path guidance system for determining control specifications to one of a man-machine interface and a controller for controlling one of a parachute and paraglider, comprising:
   an altitude measurer that determines a current altitude of one of the parachute and paraglider,
   a time measurer and a flight path controller that compares the current altitude and time to an altitude/timeline formed from a sink rate (v)/time, determines control specifications from a determined difference from the altitude/timeline, and transmits the specifications to one of the man-machine interface and the controller.

16. A process for implementation in a computer program system for determining path guidance specifications for controlling at least one of a parachute and paraglider, comprising:
   comparing a current altitude and a time to an altitude/timeline formed from a sink rate (v)/time to determine a difference;
   determining control specifications from the determined difference; and
   transmitting the control specifications to one of a man-machine interface and a controller.

* * * * *